US008764001B2

(12) United States Patent
Yang et al.

(10) Patent No.: US 8,764,001 B2
(45) Date of Patent: Jul. 1, 2014

(54) SUPPORTING APPARATUS FOR DISPLAY ASSEMBLY

(75) Inventors: Chih-Hao Yang, New Taipei (TW); Bao-Quan Shi, Shenzhen (CN); Rong Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 78 days.

(21) Appl. No.: 13/527,666

(22) Filed: Jun. 20, 2012

(65) Prior Publication Data

US 2013/0069297 A1 Mar. 21, 2013

(30) Foreign Application Priority Data

Sep. 21, 2011 (CN) .......................... 2011 1 0281678

(51) Int. Cl.

| | |
|---|---|
| ***B23Q 3/00*** | (2006.01) |
| ***B25B 5/16*** | (2006.01) |
| ***B25B 1/24*** | (2006.01) |
| ***B23Q 1/00*** | (2006.01) |
| *B25B 11/02* | (2006.01) |

(52) U.S. Cl.
USPC ................ 269/305; 269/47; 269/283; 29/464

(58) Field of Classification Search
USPC ............ 269/305, 47, 43, 99, 37, 283; 29/464, 29/281.5, 25.01
See application file for complete search history.

(56) References Cited

U.S. PATENT DOCUMENTS

| | | | | |
|---|---|---|---|---|
| 4,828,240 | A * | 5/1989 | Longenecker et al. | 269/47 |
| 5,064,321 | A * | 11/1991 | Barnes | 409/219 |
| 5,352,249 | A * | 10/1994 | Vollaro | 29/25.01 |
| 5,499,802 | A * | 3/1996 | Haberle | 269/99 |
| 5,535,995 | A * | 7/1996 | Swann et al. | 269/43 |
| 5,848,490 | A * | 12/1998 | Lee | 40/757 |
| 5,992,649 | A * | 11/1999 | Wark et al. | 211/41.17 |
| 6,158,595 | A * | 12/2000 | Wark et al. | 211/41.17 |
| 6,205,637 | B1 * | 3/2001 | Williams | 29/464 |
| 6,276,676 | B1 * | 8/2001 | Martinez et al. | 269/305 |
| 6,336,276 | B1 * | 1/2002 | Krajec et al. | 33/645 |
| 6,497,025 | B1 * | 12/2002 | Bohannan et al. | 29/281.5 |
| 6,655,535 | B2 * | 12/2003 | Wark et al. | 211/41.17 |
| 6,702,269 | B1 * | 3/2004 | Tadich | 269/37 |
| 7,624,491 | B2 * | 12/2009 | Polus | 29/464 |
| 7,963,497 | B2 * | 6/2011 | Romerein et al. | 248/558 |
| 8,403,314 | B2 * | 3/2013 | Chung et al. | 269/283 |

* cited by examiner

*Primary Examiner* — Lee D Wilson
*Assistant Examiner* — Alvin Grant
(74) *Attorney, Agent, or Firm* — Novak Druce Connolly Bove + Quigg LLP

(57) ABSTRACT

A supporting apparatus for assembling a display, includes a supporting bracket. The supporting bracket includes a plate and a restricting arm connected to the plate. The restricting arm includes a connection portion and a restricting portion the restricting. The restricting portion is parallel to the plate to define a restricting space between the restricting portion and the plate. The restricting space receives the display therein. The restricting portion and the plate restricts the display in the restricting space in a first direction which is perpendicular to the plate. A plurality of blocks are movably mounted on the plate. The plurality of blocks restrict the display in the restrict space in a second direction which is parallel to the plate.

14 Claims, 5 Drawing Sheets

SUPPORTING APPARATUS FOR DISPLAY ASSEMBLY

TECHNICAL FIELD

The present disclosure relates to supporting apparatus, and particularly to a supporting apparatus for assembling a display.

DESCRIPTION OF RELATED ART

Foldable electronic devices, such as notebook computers, foldable mobile phones, generally include a base, and a cover pivotally mounted on the base via a hinge. A display is mounted in the cover to show information thereon. The display is mounted on the cover via a pair of securing strips. However, it may be difficult to mount the pair of securing strips on the display because the display is usually fragile.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
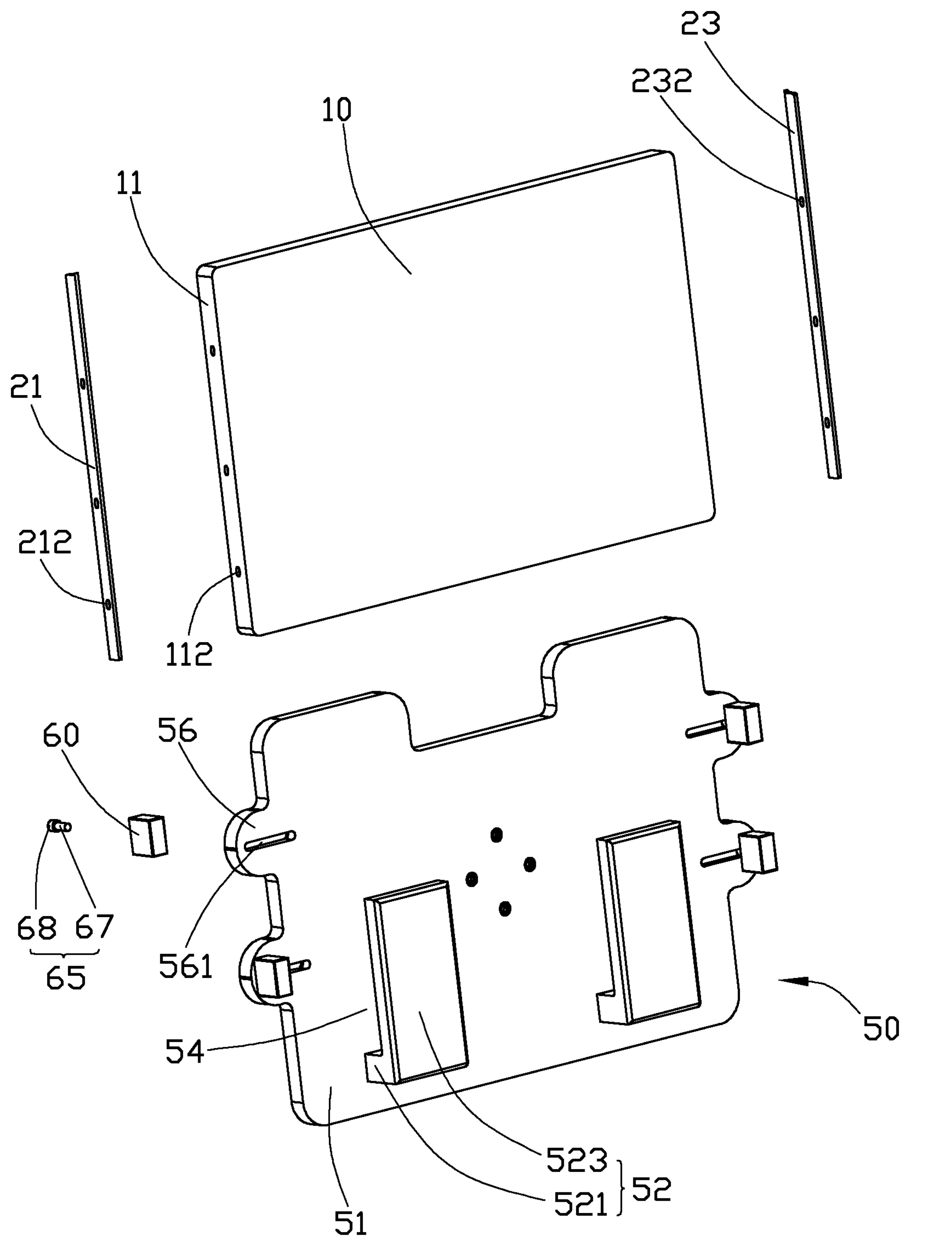
FIG. 1 is an exploded and isometric view of a supporting apparatus of display assembly with a display.
Figure 2:
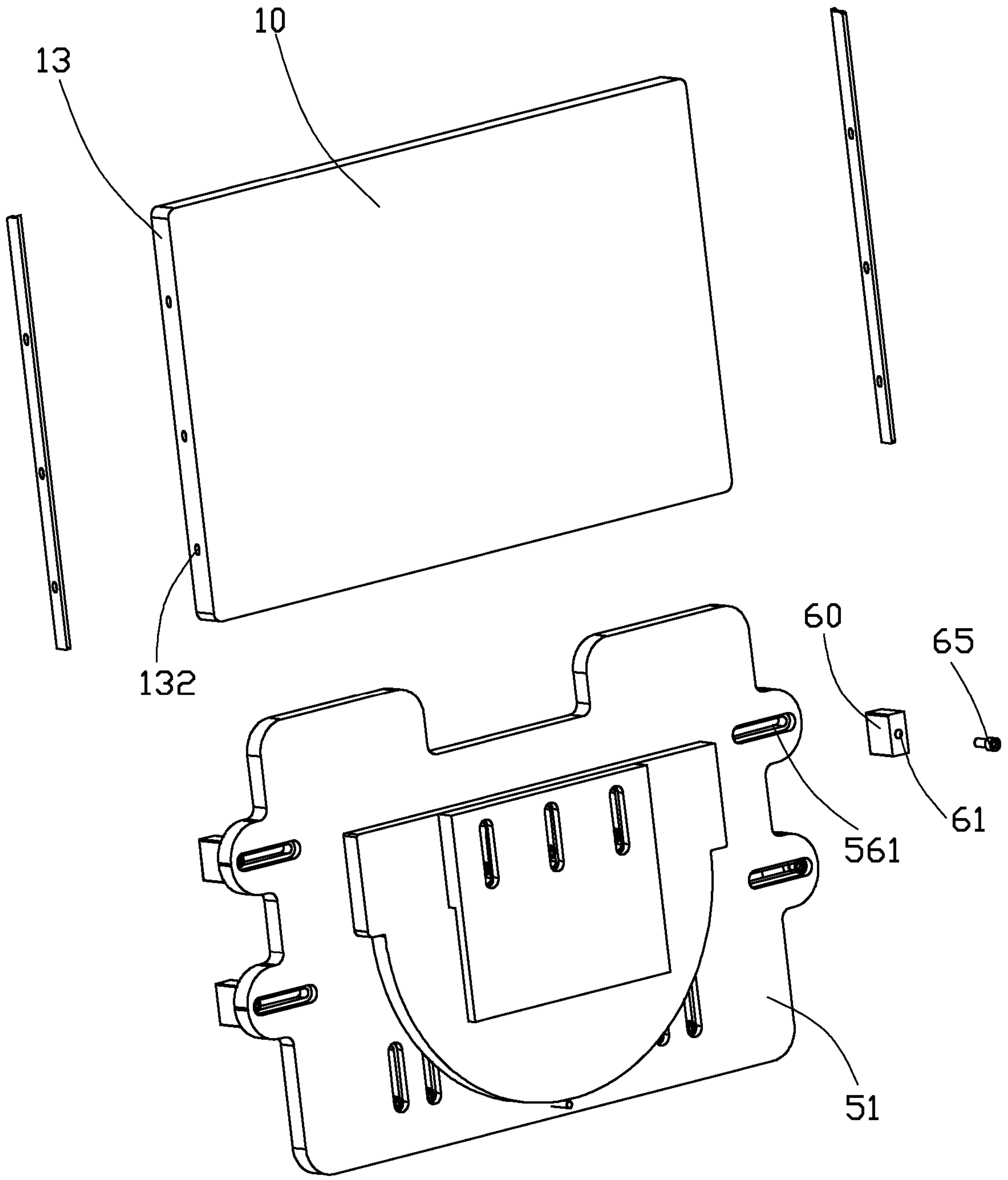
FIG. 2 is similar to FIG. 1, but viewed from another aspect.
Figure 3:
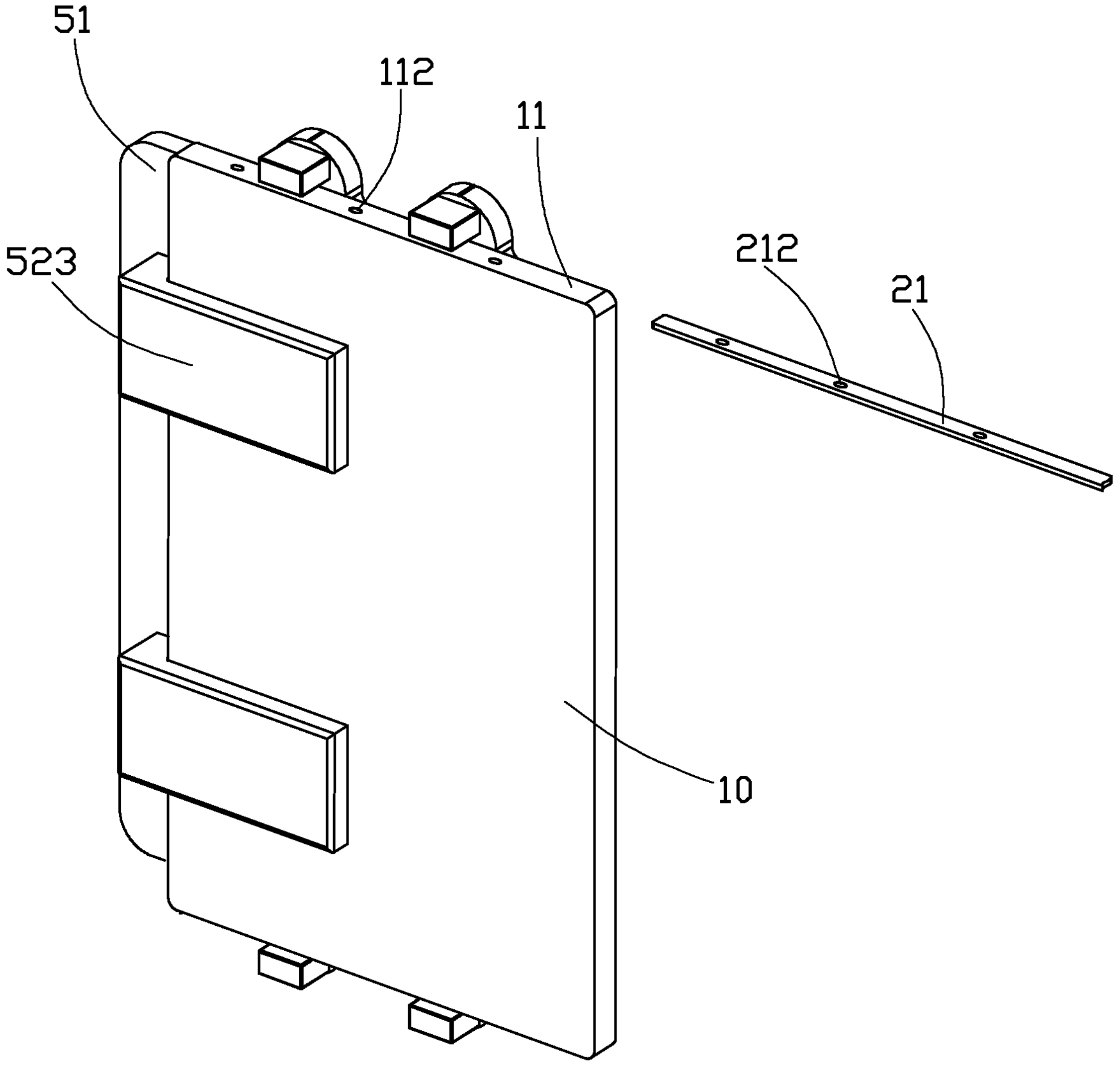
FIG. 3 is an assembly view of the supporting apparatus with the display being partially assembled.
Figure 4:
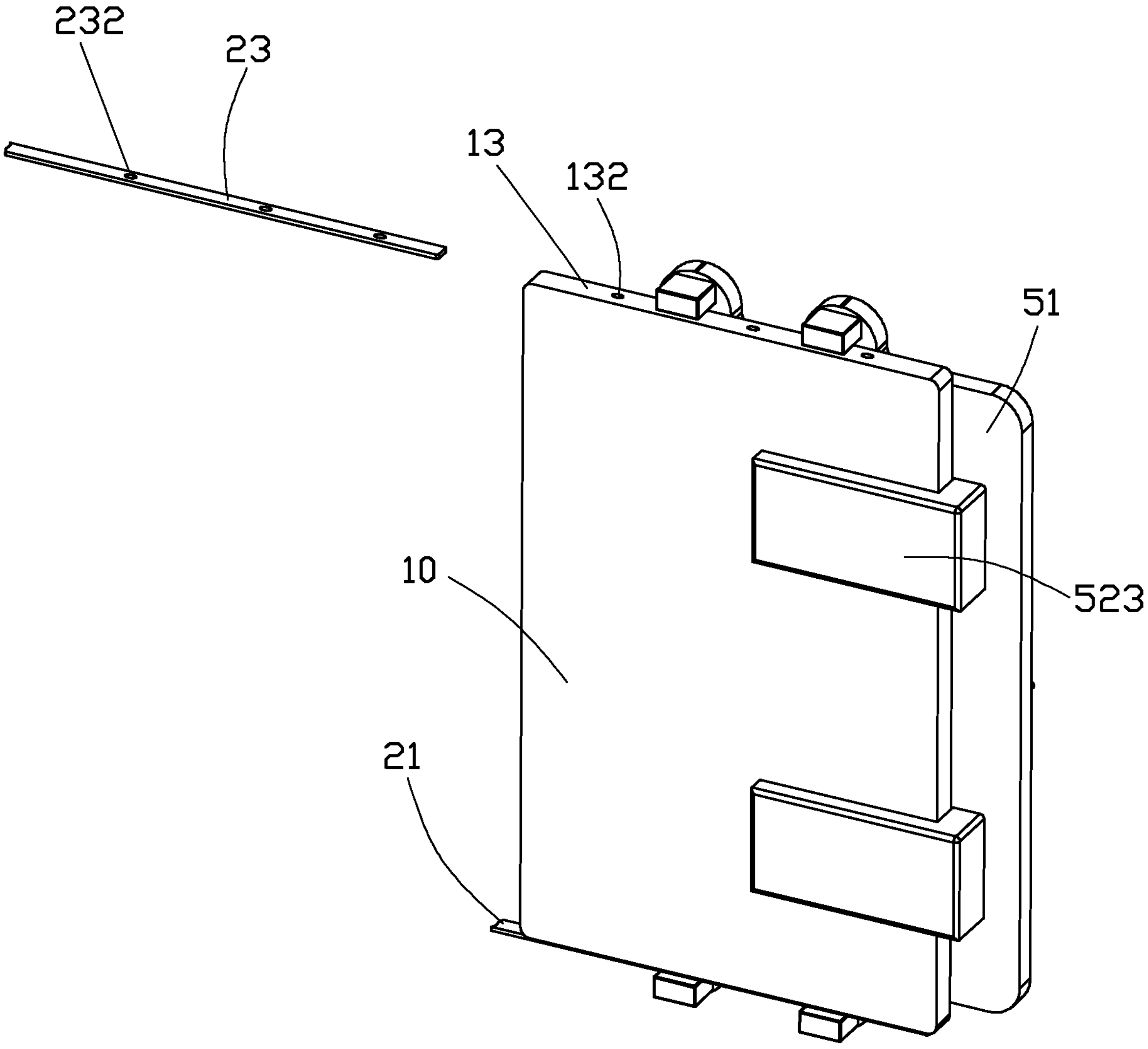
FIG. 4 is another assembly view of the supporting apparatus with the display being partially assembled.
Figure 5:
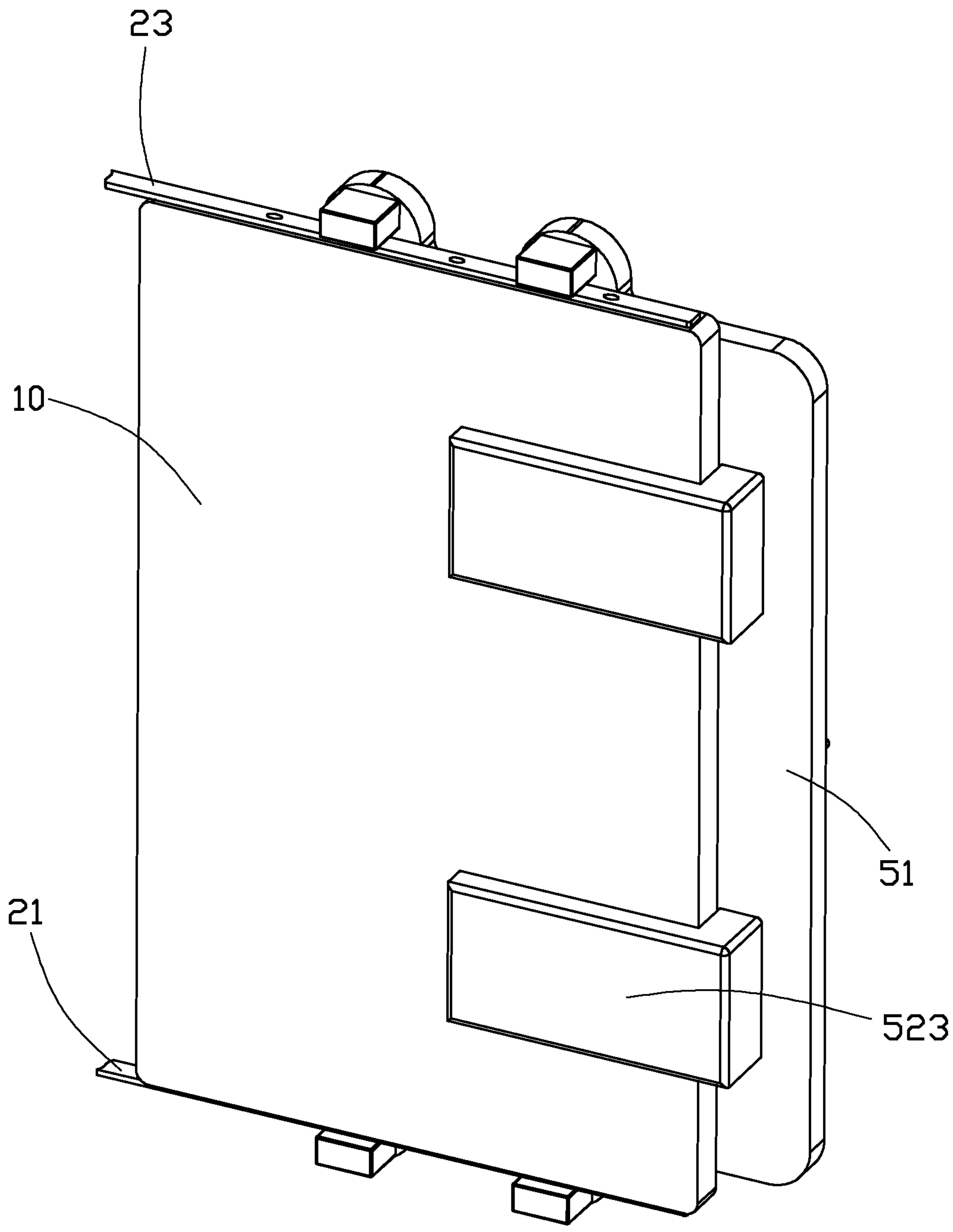
FIG. 5 is an assembly view of the supporting apparatus with the display being completely assembled.

FIGS. 1 and 2 illustrates an embodiment of a supporting apparatus is used to support a display 10 when the display 10 is assembled with a first securing strip 21 and a second securing strip 23. The supporting apparatus includes a supporting bracket 50 and four blocks 60.

The display 10 includes a first end 11 and a second end 13 opposite to the first end 11. The first end 11 defines three first securing holes 112. The second end 13 defines three second securing holes 132.

The first strip 21 is adapted to be mounted on the first end 11 of the display 10. The first strip 21 defines three first through holes 212 corresponding to the three first securing holes 112. The second strip 23 is adapted to be mounted on the second end 13 of the display 10. The second strip 23 defines three second through holes 232 corresponding to the three second securing holes 132.

The supporting bracket 50 includes a plate 51. The plate 51 is generally rectangular-shaped. A pair of restricting arms 52 are connected to a side of the plate 51.

Each of the pair of restricting arms 52 includes a connection portion 521 and a restricting portion 523. The connection portion 521 is perpendicularly connected to the plate 51. The restricting portion 523 is perpendicularly connected to a distal end of the connection portion 521. The restricting portion 523 is approximately parallel to the plate 51. A distance between the restricting portion 523 and the plate 51 is approximately equal to a thickness of the display 10. A restricting space 54 is defined between the restricting portion 523 and the plate 51. Each of the opposite ends of the plate 51 is connected to a pair of ear pieces 56. Each of the pair of ear pieces 56 defines a positioning groove 561.

The four blocks 60 can be mounted on the ear pieces 56 via four fasteners 65. Each of the four blocks 60 defines a mounting hole 61 which extends through corresponding block 60. Each of the four fasteners 65 includes a fastening pole 67 and a head portion 68. A diameter of the fastening pole 67 is smaller than a width of the positioning groove 561. A diameter of the head portion 68 is greater than the width of the positioning groove 561. The fastening pole 67 forms screws thereon. The mounting hole 61 forms screws therein corresponding to the fastening pole 67.

The block 60 is placed on a side of the plate 51 on which the pair of restricting arms 52 is connected. The mounting hole 61 of the block 60 is aligned to the positioning groove 561. The fastening pole 67 of the fastener 65 is inserted in the positioning groove 561, and further screws in the mounting hole 61 until the head portion 68 abuts on the plate 51. The block 60 is secured on the plate 51. A position of the block 60 can be adjusted by screwing the fastening pole 67 in the mounting hole 61 or out of the mounting hole 61.

Referring to FIGS. 1 to 5, to assemble the first securing strip 21 and the second securing strip 23 on the display 10, the display 10 is firstly placed in the restricting space 54. A bottom end of the display 10 is located on the connection portions 521 of the pair of restricting arms 52. The plate 51 and the pair of restricting arms 52 restrict opposite sides of the display 10 to prevent the display 10 from moving in a first direction which is perpendicular to the plate 51. Then, the supporting bracket 50 and the display 10 rotates 90 degrees in a clockwise direction. The second end 13 of the display 10 is placed on two blocks 60 which is adjacent to second end 13. The first securing strip 21 is placed on the first end 11 of the display 10. The first through holes 212 of the first securing strip 21 is aligned with the first securing holes 112 of the first end 11. A plurality of screws (not shown) are mounted in the first through holes 212 and the first securing holes 112 to secure the first securing strip 21 on the display 10.

Then, the supporting bracket 50 and the display 10 rotate about 180 degrees. The first securing strip 31 of the display 10 is placed on two blocks 60 which is adjacent to the first end 11. The second securing strip 23 is placed on the second end 13 of the display 10. The second through holes 232 of the second securing strip 23 is aligned to the second securing holes 132 of the second end 13. A plurality of screws (not shown) are mounted in the second through holes 232 and the second securing holes 132 to secure the second securing strip 23 on the display 10. At last, the display 10 mounted with the first securing strip 21 and the second securing strip 21 can be moved out of the supporting bracket 50.

In the supporting bracket 50, positions of the blocks 60 can be adjusted to suit different displays.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the invention to the full extent indicated by the broad general meaning of the terms in which the appended claims are expressed.

What is claimed is:

1. A supporting apparatus for assembling a display, comprising:

a supporting bracket, comprising a plate and a restricting arm connected to the plate, the restricting arm comprising a connection portion and a restricting portion, the restricting portion being parallel to the plate and defines a restricting space between the restricting portion and the plate, the restricting space being configured to receive the display therein, the restricting portion and the plate being configured to restrict the display in the restricting space in a first direction which is perpendicular to the plate; and a plurality of blocks movably mounted on the plate, and the plurality of blocks being configured to restrict the display in the restrict space in a second direction which is parallel to the plate;

wherein opposite ends of the plate are connected to a plurality of ear pieces, and the plurality of blocks are movably mounted on the plurality of ear pieces.

2. The supporting apparatus of claim 1, wherein each of the plurality of ear pieces defines a positioning groove, each of the plurality of blocks defines a mounting hole, and each of the plurality of blocks is mounted on each of the plurality of ear pieces by a fastener securing the positioning groove in the mounting hole.

3. The supporting apparatus of claim 2, wherein the fastener comprises a fastening pole and a head portion, the fastening pole is configured to be inserted through the positioning groove and secured in the mounting hole, and the head portion is configured to abut the plate.

4. The supporting apparatus of claim 3, wherein fastening pole is configured to be accommodated in different positions of the positioning groove.

5. The supporting apparatus of claim 3, wherein a diameter of the fastening pole is smaller than a width of the positioning groove, a diameter of the head portion is greater than the width of the positioning groove.

6. The supporting apparatus of claim 1, wherein the connection portion is perpendicularly connected to the plate, the restricting portion is perpendicularly connected to a distal end of the connection portion.

7. A supporting apparatus for assembling a display, comprising:

a supporting bracket comprising a plate and a restricting arm connected to the plate, the restricting arm comprising a connection portion connected to the plate, the connection portion being configured to support the display on the plate; and a plurality of blocks movably mounted adjacent opposite ends of the plate, and the plurality of blocks being configured to restrict the display on the plate;

wherein opposite ends of the plate are connected to a plurality of ear pieces, and the plurality of blocks are movably mounted on the plurality of ear pieces.

8. The supporting apparatus of claim 7, wherein the restricting arm comprises a restricting portion connected to the connection portion, the restricting portion is parallel to the plate and defines a restricting space between the restricting portion and the plate, and the restricting space is configured to receive the display therein.

9. The supporting apparatus of claim 8, wherein the restricting portion and the plate are configured to restrict the display in the restricting space in a first direction which is perpendicular to the plate, and the plurality of blocks are configured to restricting the display in the restrict space in a second direction which is parallel to the plate.

10. The supporting apparatus of claim 7, wherein the connection portion is perpendicularly connected to the plate, the restricting portion is perpendicularly connected to a distal end of the connection portion.

11. The supporting apparatus of claim 7, wherein each of the plurality of ear pieces defines a positioning groove, each of the plurality of blocks defines a mounting hole, and each of the plurality of blocks is mounted on each of the plurality of ear pieces by a fastener securing the positioning groove in the mounting hole.

12. The supporting apparatus of claim 11, wherein the fastener comprises a fastening pole and a head portion, the fastening pole is configured to be inserted through the positioning groove and secured in the mounting hole, and the head portion is configured to abut the plate.

13. The supporting apparatus of claim 12, wherein fastening pole is configured to be accommodated in different positions of the positioning groove.

14. The supporting apparatus of claim 12, wherein a diameter of the fastening pole is smaller than a width of the positioning groove, a diameter of the head portion is greater than the width of the positioning groove.

* * * * *